Feb. 24, 1970  L. E. COLEMAN  3,497,467
FILMS, LATICES AND COATINGS OF N-3-OXOHYDRO-CARBON-SUBSTITUTED
ACRYLAMIDE POLYMERS
Filed July 19, 1967

INVENTOR
LESTER E. COLEMAN
BY William H. Pittman

United States Patent Office 3,497,467
Patented Feb. 24, 1970

3,497,467
FILMS, LATICES AND COATINGS OF N-3-OXO-HYDROCARBON-SUBSTITUTED ACRYLAMIDE POLYMERS

Lester E. Coleman, Cleveland, Ohio, assignor to The Lubrizol Corporation, Wickliffe, Ohio, a corporation of Ohio
Continuation-in-part of applications Ser. No. 600,689, Nov. 30, 1966, and Ser. No. 581,308, Sept. 22, 1966. The latter application being a continuation-in-part of Ser. No. 326,394, Nov. 27, 1963. This application July 19, 1967, Ser. No. 654,421
The portion of the term of the patent subsequent to Oct. 4, 1983, has been disclaimed
Int. Cl. C08f 3/84, 1/13, 47/14
U.S. Cl. 260—29.6          29 Claims

ABSTRACT OF THE DISCLOSURE

Latices of polymers (both homopolymers and interpolymers) of N-3-oxohydrocarbon-substituted acrylamides, preferably N - (1,1 - dimethyl-3-oxobutyl)acrylamide or diacetone acrylamide, are prepared by polymerization in water, a water-soluble hydroxylated organic solvent or a mixture of such a solvent with water, in the presence of sufficient emulsifier, dispersing agent or protective colloid to cause formation of a stable emulsion. The latices are useful in applications where a "breathable" film or coating is desired, such as in adhesives, paints, plywood coatings, fabric coatings and the like. They may also be used as thickeners, especially in water-soluble paints and similar compositions.

Figure 1:
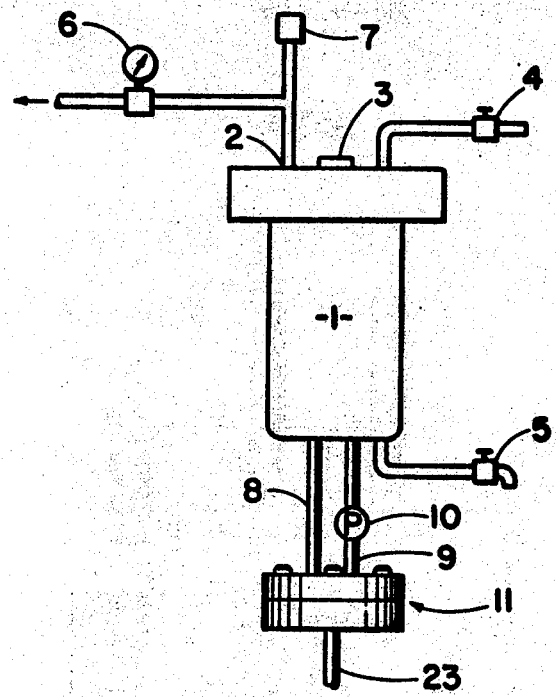

Films may also be prepared from bulk, solution, suspension or non-latex emulsion polymers. They may be crosslinked by reaction with a compound (such as a free radical catalyst, oxidizing agent, polyamine, or alkoxide of a polyvalent metal) which induces mutually reactive sites on the polymer molecule, thereby causing the formation of a direct valance bond between at least two of said molecules, or which forms a molecular bridge connecting a plurality of polymer molecules. The films are particularly useful as membranes for the desalination of water by hyperfiltration.

RELATED APPLICATIONS

This application is a continuation-in-part of copending applications Ser. No. 600,689, filed Nov. 30, 1966, and Ser. No. 581,308, filed Sept. 22, 1966, both now abandoned. The latter is a continuation-in-part of application Ser. No. 326,394, filed Nov. 27, 1963, now U.S. Patent 3,277,056.

SUMMARY AND OBJECTS OF THE INVENTION

This invention relates to new polymeric compositions of matter, and more particularly to films and latices of homopolymers and interpolymers of N-3-oxohydrocarbon-substituted acrylamides having the general formula

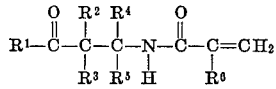

wherein each of $R^1$, $R^2$, $R^3$, $R^4$, and $R^5$ is individually hydrogen or a hydrocarbon radical and $R^6$ is hydrogen or a lower alkyl radical.

A principal object of the present invention is to provide new polymer films, membranes, latices and solutions which are useful in a wide variety of applications.

A further object is to provide "breathable" and vapor-permeable films, coatings and the like.

A still further object is to provide an improved method for desalination of water.

Other objects will in part be obvious and will in part appear hereinafter.

THE POLYMERS

As previously indicated, the polymeric compositions of this invention are prepared from N-3-oxohydrocarbon-substituted acrylamides conforming to the general formula given hereinabove. In this formula, the substituents $R^{1-5}$ are hydrogen or hydrocarbon radicals. The term "hydrocarbon radical" as used herein includes aliphatic, cycloaliphatic and aromatic hydrocarbon radicals and derived radicals containing substituents such as halogen, ether, ester, nitro and the like so long as these substituents are not present in proportions sufficiently large to alter significantly the hydrocarbon character of the radical. The upper limit with respect to the proportion of such substituents is about 70 percent based on the weight of the hydrocarbon portion of the radical. Thus, the radicals may be, for example, methyl, ethyl, n-butyl, sec-butyl, n-decyl, cyclopentyl, cyclohexyl, phenyl, benzyl, tolyl, 2-chloro-1-butyl, p-nitrophenyl, o-chlorophenyl and the like.

The radical $R^6$ is preferably a hydrogen atom but may in some instances be a lower alkyl radical; that is, an alkyl radical containing no more than 10 carbon atoms. If $R^6$ is alkyl, it is preferably methyl.

The following are examples of typical monomers suitable for preparing the polymeric compositions of this invention.

N-(1,1-dimethyl-3-oxobutyl)acrylamide

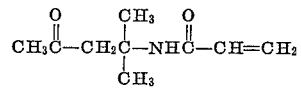

N-(1-methyl-3-oxopropyl)methacrylamide

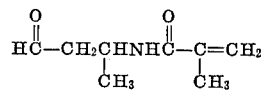

N-(1,3-diphenyl-1-methyl-3-oxopropyl)acrylamide

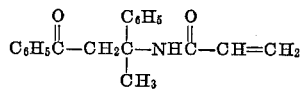

N-[1,3-di-(p-nitrophenyl)-1-methyl-3-oxopropyl]
methacrylamide

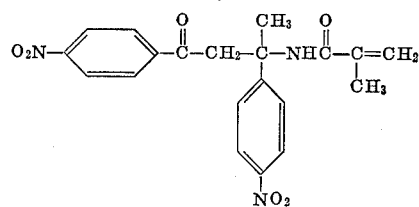

The preparation of monomers suitable for conversion into the polymeric compositions of this invention is described in the aforementioned U.S. Patent 3,277,056, and in copending application Ser. No. 582,501, filed Sept. 28, 1966. In a preferred embodiment of the invention, $R^{1-5}$ are hydrogen or lower alkyl radicals; an especially preferred monomer is N-(1,1-dimethyl-3-oxobutyl)acrylamide, hereinafter sometimes referred to as diacetone acrylamide. For the sake of convenience and brevity, the remainder of this specification will deal specifically with diacetone acrylamide; however, it is to be understood that any of the other N-3-oxohydrocarbon-substituted acrylamides may be substituted therefor when appropriate.

As used in this application, the term "polymer" includes homopolymers, copolymers, terpolymers and other interpolymers with a wide variety of other monomers, including: (1) esters of unsaturated alcohols such as allyl alcohol and vinyl alcohol with saturated acids such as acetic, propionic, or stearic acids, or with unsaturated acids such as acrylic or methacrylic acids; (2) esters of saturated alcohols with unsaturated acids such as acrylic and methacrylic acids; (3) vinyl cyclic compounds such as styrene and its analogs; (4) unsaturated ethers such as methyl vinyl ether, diallyl ether and the like; (5) unsaturated ketones such as methyl vinyl ketone; (6) unsaturated amides such as acrylamide, methacrylamide and N-methylacrylamide; (7) unsaturated aliphatic hydrocarbons such as ethylene, propylene and the butenes; (8) vinyl halides, especially vinyl chloride and vinyl fluoride; (9) esters of unsaturated polyhydric alcohols such as butenediol with saturated or unsaturated acids; (10) unsaturated acids such as maleic, fumaric, citraconic, or itaconic acids, or their halides or anhydrides; (11) unsaturated nitriles such as acrylonitrile or methacrylonitrile. Other suitable comonomers are listed in U.S. Patent 3,277,056. The interpolymers may contain from about 5% to about 95% diacetone acrylamide, based on the total monomer weight.

LATICES

As used herein, the term "latex" refers to a stable dispersion or emulsion of a polymer in a liquid. The liquid is normally water, but according to the present invention it may also be a water-soluble hydroxylated organic solvent (e.g., an alcohol, polyhydroxy alcohol, keto alcohol, ether alcohol or the like) or a mixture of water with such a hydroxylated solvent, said mixture usually containing a major amount of water.

Especially useful organic solvents are relatively low molecular weight monohydroxy and polyhydroxy alcohols such as methanol, ethanol, ethylene glycol, diethylene glycol and the like.

The preparation of latices is ordinarily accomplished by polymerization in the presence of an emulsifier, dispersing agent or protective colloid, said emulsifier being present in sufficient quantity to cause formation of a stable emulsion. Suitable emulsifiers include cationic materials such as stearyl dimethyl benzyl ammonium chloride; non-ionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose; gum arabic, dextrins or polyvinyl alcohol. Depending on the use to which the latex is to be put, a particular emulsifier may be preferred; for example, polyvinyl alcohol is incompatible with borax and so some other emulsifier should be used when the latex is intended as a constituent for a paint to be applied to drywall or the like, which contains borated dextrin.

It has been found that diacetone acrylamide is surface active, and therefore can be converted to polymer latices with the use of less emulsifier than is necessary with most other unsaturated monomers. Nevertheless, the use of some emulsifier is generally necessary.

Since the emulsion polymerization of diacetone acrylamide proceeds by a free radical mechanism, a water-soluble free radical catalyst is used. Such catalysts are well known to those skilled in the art and include hydrogen peroxide, alkali metal and ammonium persulfates, chlorate-sulfite and similar redox systems, and the like. If the reaction medium is nonaqueous, catalysts such as benzoyl peroxide, lauroyl peroxide, azobisisobutyronitrile and the like which are soluble therein may be used.

The polymerization is usually effected at a temperature of about 20–90° C., but the temperature may sometimes be as low as about −25° C., particularly where one of the monomers is a gas at room temperature (e.g., vinyl chloride).

As previously indicated, the polymer latices may be prepared from diacetone acrylamide alone or from mixtures of diacetone acrylamide with the other polymerizable monomers listed. Of particular interest for this purpose are the interpolymers (especially copolymers) of diacetone acrylamide with vinyl monomers such as vinyl acetate, vinyl chloride, vinylidene chloride and vinyl ethers; unsaturated aromatic and heterocyclic monomers such as styrene and N-vinylpyrrolidone; alcohols such as allyl alcohol; unsaturated esters such as dibutyl maleate and dibutyl fumarate; and acrylic monomers. This latter term is meant to include such compounds as acrylonitrile, methacrylonitrile, acrylamide, methacrylamide, and esters of acrylic and methacrylic acids. A second class of useful latices is formed by copolymerization of diacetone acrylamide with an unsaturated acid such as acrylic or methacrylic acid, preferably in combination with one of the monomers listed above (especially the lower alkyl acrylates). While these terpolymers are acidic when prepared, they may be neutralized by addition of an alkali such as sodium hydroxide, potassium hydroxide, ammonium hydroxide or the like.

The following examples illustrate methods for the preparation of the latices of this invention.

Example 1

A reaction vessel is flushed with a dilute aqueous solution of potassium persulfate at 80° C. for two hours, and then rinsed with distilled water. The flask is charged with 400 grams of distilled water and 90 grams of diacetone acrylamide. Vinyl acetate, 10 grams, is added and the mixture is purged with nitrogen for one-half hour and heated to 50° C. Finally, one gram of sodium lauryl sulfate and 0.1 gram of ammonium persulfate are added and the polymerization reaction is allowed to proceed for one hour at 50–70° C. The mixture is then filtered through a fine-mesh conical paint filter. There is obtained 495 grams of a milky white 20% aqueous emulsion of diacetone acryamide-vinyl acetate (9:1) copolymer latex.

Example 2

The procedure of Example 1 is repeated, except that the monomer mixture comprises 50 grams of diacetone acrylamide and 50 grams of vinyl acetate. The product is a latex of a 1:1 copolymer.

Example 3

The procedure of Example 1 is repeated, except that the monomer mixture comprises 5 grams of diacetone acrylamide and 95 grams of vinyl acetate. A copolymer latex with a 5:95 weight ratio of diacetone acrylamide to vinyl acetate is obtained.

Example 4

A solution of 5,600 grams of diacetone acrylamide, 2,400 grams of 2-ethylhexyl acrylate, 200 grams of polyvinyl alcohol, and 120 grams of dioctyl sodium sulfosuccinate (75% solids) in 12,800 grams of water is purged with nitrogen and a solution of 8 grams of ammonium persulfate in 100 grams of water is added. The solution is heated to 60° C. over 1½ hours as polymerization occurs, and is then heated to 65–70° C. and held there for one hour. Finally, it is cooled to 30° C. and filtered through cheesecloth. The product is a 41.4% aqueous latex of a diacetone acrylamide-2-ethylhexyl acrylate (70:30) copolymer.

Example 5

A solution of 700 grams of diacetone acrylamide in 1,500 grams of distilled water is stirred under nitrogen as 300 grams of 2-ethylhexyl acrylate is added. Sodium lauryl sulfate (5.0 grams) and ammonium persulfate (0.7 gram) are added and the solution is heated to 40° C. An exothermic reaction occurs which raises the temperature to 70° C. over one-half hour. The temperature is cooled to 60° C. and held there for one hour, after which the polymeric mixture is filtered through cheesecloth. The product is a milk-white 40% emulsion of a 70:30 copolymer of diacetone acrylamide with 2-ethylhexyl acrylate.

Example 6

The procedure of Example 4 is repeated, except that the reaction mixture contains 2,333 grams of water and 10 grams of sodium lauryl sulfate. The product is a 30% aqueous emulsion of the diacetone acrylamide-2-ethylhexyl acrylate copolymer.

Example 7

The procedure of Example 5 is employed for the preparation of a 20% aqueous emulsion from 350 grams of diacetone acrylamide, 150 grams of 2-ethylhexyl acrylate, 2,000 grams of distilled water, 2.5 grams of sodium lauryl sulfate and 0.4 gram of ammonium persulfate.

Example 8

A solution of 720 grams of diacetone acrylamide in 1752 grams of water is purged with nitrogen and 480 grams of 2-ethylhexyl acrylate, 18 grams of a 1% aqueous solution of dioctyl sodium sulfosuccinate and 30 grams of polyvinyl alcohol are added. Finally, 1.2 grams of ammonium persulfate is added and the mixture is heated to 55° C. An exothermic reaction occurs which causes the temperature to rise to 78° C. A small amount of polymer separates as a white granular solid. The mixture is cooled to 60° C. and held at this temperature for one hour, and is then filtered through cheesecloth. There is obtained a stable 40% emulsion of a 60:40 diacetone acrylamide-2-ethylhexyl acrylate copolymer.

Example 9

A reaction flask is charged with 112 grams of diacetone acrylamide, 48 grams of 2-ethylhexyl acrylate, 40 grams of acrylic acid, and 800 grams of water. The reaction mixture is blown with nitrogen and 4 grams of sodium lauryl sulfate and 0.1 gram of ammonium persulfate are added. The flask is heated to 50–60° C., whereupon an exothermic reaction takes place with an increase in temperature to 70° C. After about 4 hours at 60° C., there is obtained a milk-white emulsion which is filtered through cheesecloth. The product is a 20% aqueous emulsion of a 56:24:20 terpolymer of diacetone acrylamide, 2-ethylhexyl acrylate and acrylic acid. It may then be neutralized by addition of 10% aqueous ammonium hydroxide.

Example 10

A mixture of 140 grams of diacetone acrylamide, 60 grams of 2-ethylhexyl acrylate, 50 grams of acrylic acid, and 250 grams of ethylene glycol is heated to 65° C. under nitrogen and 1.25 grams of lauroyl peroxide is added, with stirring. An exothermic reaction occurs which raises the temperature to 144° C.; the mixture is cooled in an ice-water bath to avoid overheating. The product is a translucent, rubbery fluid which is a 50% emulsion in ethylene glycol of a 56:24:20 terpolymer of diacetone acrylamide, 2-ethylhexyl acrylate and acrylic acid.

Example 11

A solution of 354 grams of diacetone acrylamide in 2391 grams of water is purged with nitrogen, and a mixture of 234 grams of 2-ethylhexyl acrylate and 12 grams of acrylic acid is added, followed by 9 grams of a 1% aqueous solution of dioctyl sodium sulfosuccinate and 0.6 gram of ammonium persulfate. The mixture is heated at 70° C. until polymerization is complete. It is then cooled to 60° C., held at this temperature for one hour and filtered through cheesecloth. The product is a 20% aqueous latex of a 59:39:2 terpolymer of diacetone acrylamide, 2-ethylhexyl acrylate and acrylic acid. This latex is neutralized by portionwise addition of 10% aqueous ammonium hydroxide to a pH of 7.

Example 12

A 63:27:10 terpolymer of diacetone acrylamide, 2-ethylhexyl acrylate and acrylic acid is prepared from 126 grams of diacetone acrylamide, 54 grams of 2-ethylhexyl acrylate and 20 grams of acrylic acid in 800 grams of water, using 0.9 gram of sodium lauryl sulfate and 0.18 gram of ammonium persulfate. The product, a milk-white 20% emulsion, is neutralized to a pH of 7 by portionwise addition of 10% aqueous ammonium hydroxide.

Example 13

Diacetone acrylamide (266 grams), 2-ethylhexyl acrylate (114 grams), acrylic acid (20 grams), and distilled water (1600 grams) are mixed and purged with nitrogen. To the mixture is added 8 grams of sodium lauryl sulfate and 0.4 gram of ammonium persulfate. The reaction mass is heated to 50° C. and held at that temperature until polymerization is complete. The resulting emulsion, after filtration through cheesecloth, contains 20% of a 66.5:28.5:5 terpolymer of diacetone acrylamide, 2-ethylhexyl acrylate and acrylic acid. This emulsion is neutralized by portionwise addition of 10% aqueous ammonium hydroxide until a pH of 7 is reached.

Example 14

The procedure of Example 13 is repeated, using a mixture of 343 grams of diacetone acrylamide, 147 grams of 2-ethylhexyl acrylate, 10 grams of acrylic acid, 2,000 grams of water, 10 grams of sodium lauryl sulfate and 0.5 gram of ammonium persulfate. The product, a 20% aqueous emulsion of a 68.6:29.4:2.0 terpolymer, is neutralized with 10% aqueous ammonium hydroxide.

Example 15

A mixture of 104 grams of diacetone acrylamide, 2.25 grams of a 1% aqueous solution of dioctyl sodium sulfosuccinate and 123 grams of distilled water is stirred slowly under nitrogen, and 43 grams of 2-ethylhexyl acrylate and 3 grams of acrylic acid are added, followed by 0.15 gram of ammonium persulfate. The mixture is heated to 55° C., whereupon an exothermic reaction occurs which causes the temperature to rise to 86° C. After the polymerization is complete, the mixture is cooled to 60° C. and filtered through cheesecloth. It is then neutralized to a pH of 7 by adding 10% aqueous ammonium hydroxide. The product is a 30% aqueous latex of a 69:29:2 terpolymer of diacetone acrylamide, 2-ethylhexyl acrylate and acrylic acid.

Example 16

A mixture of 950 grams of diacetone acrylamide, 3,800 grams of diethylene glycol is purged with nitrogen, and 5 grams of sodium lauryl sulfate and 1 gram of ammonium persulfate are added. The mixture is heated to 50° C., at which temperature an exothermic reaction occurs which raises the temperature of the mixture to 70° C. The mixture is cooled and filtered through cheesecloth. There is obtained a smooth, milk-white liquid comprising a 27% emulsion of diacetone acrylamide homopolymer.

Example 17

A mixture of 20 grams of diacetone acrylamide, 20 grams of ethyl acrylate, 0.2 gram of sodium lauryl sulfate and 160 grams of water is purged with nitrogen, and 0.04 gram of ammonium persulfate is added with stirring. The mixture is heated to 55° C. and held at this temperature for about 2½ hours. It is then filtered. The filtrate is an aqueous latex of a 1:1 diacetone acrylamide-ethyl acrylate copolymer.

Example 18

A reaction vessel is charged with 151.4 grams of ethyl acrylate, 8.0 grams of diacetone acrylamide, 1.60 grams of sodium lauryl sulfate, and 240.2 grams of water. The mixture is purged with nitrogen, heated to 60° C. and stirred vigorously as 0.16 gram of ammonium persulfate is added. As stirring is continued, and exothermic reaction takes place which raises the temperature of the mixture to 90° C. Heating at 60° C. is continued for two hours, after which the mixture is cooled and filtered through cloth. There is obtained a 40% aqueous of 95:5 ethyl acrylate-diacetone acrylamide polymer.

Example 19

The procedure of Example 18 is repeated using a reaction mixture comprising 20 grams of diacetone acrylamide, 20 grams of acrylonitrile, 0.2 gram of sodium lauryl sulfate, 160 grams of water and 0.04 gram of ammonium persulfate. After filtration, there is obtained a 175% aqueous emulsion of a 1:1 diacetone acrylamide-acrylonitrile copolymer.

Example 20

The procedure of Example 19 is repeated, except that the acrylonitrile is replaced by 20 grams of styrene. The product is a 17.5% aqueous emulsion of a 1:1 styrene-diacetone acrylamide copolymer.

Example 21

A mixture of 1.61 grams of sodium lauryl sulfate, 0.023 gram of ferrous sulfate, 5.1 grams of diacetone acrylamide, 120.2 grams of water and 80.2 grams of methanol is cooled in a Dry Ice-carbon tetrachloride bath and purged with nitrogen. Then 138 grams of vinyl chloride is passed into the solution at −20 to −15° C. over three hours. Finally, three drops of a 30% solution of hydrogen peroxide is added. An exothermic reaction begins which causes the temperature of the mixture to rise to about −4° C. Stirring and cooling is continued for two hours. The product is a stable 40% emulsion in water and methanol of a 95:5 vinyl chloride-diacetone acrylamide copolymer.

Example 22

A mixture of 675 grams of diacetone acrylamide, 675 grams of dibutyl maleate, 1650 grams of water, 27 grams of a 1% aqueous solution of dioctyl sodium sulfosuccinate, 27 grams of an alkaryl polyether alcohol sulfonate emulsifying agent, 1.35 grams af ammonium persulfate and 1.35 grams of sodium sulfite is stirred under nitrogen. An exothermic reaction takes place which causes the temperature to rise to 60° C.; the mixture is then heated to 75° C. for about 2 hours, cooled to room temperature and filtered through cheesecloth. There is obtained a 45% aqueous latex of a polymer comprising approximately equal amounts of diacetone acrylamide and dibutyl maleate.

Example 23

Following the procedure of Example 22, a 45% aqueous latex is prepared from 337 grams of diacetone acrylamide, 337 grams of 2-ethylhexyl acrylate, 800 grams of water, 27 grams of emulsifier, 13.5 grams of dioctyl sodium sulfosuccinate solution, 1.35 grams of ammonium persulfate and 1.35 grams of sodium sulfite.

Example 24

Following the procedure of Example 22, a 20% aqueous latex is prepared from 3420 grams of diacetone acrylamide, 400 grams of 2-ethylhexyl acrylate, 100 grams of acrylic acid, 80 grams of vinylidene chloride, 15.8 liters of water, 80 grams of emulsifier, 80 grams of 1% aqueous dioctyl sodium sulfosuccinate solution, 2 grams of sodium sulfite and 2 grams of ammonium persulfate. After filtration, the latex is neutralized by the addition of aqueous ammonium hydroxide.

Example 25

A mixture of 325 grams of diacetone acrylamide, 125 grams of acrylonitrile, 25 grams of 2-ethylhexyl acrylate, 22 grams of acrylic acid and 2000 grams of water is purged with nitrogen. To the mixture are added 10 grams of sodium lauryl sulfate, 0.5 gram of ammonium persulfate and 2.5 grams of 1,3-butylene dimethacrylate The mixture is heated slowly to 60° C., and an exothermic then occurs which raises the temperature to 70° C. When polymerization is complete, the mixture is cooled to 60° C. and held there for two hours, after which time it is heated to 90° C. for one-half hour. Finally, it is cooled again to 60° C. and filtered through cheesecloth. The product is a 20% aqueous emulsion of an interpolymer of diacetone acrylamide, acrylonitrile, 2-ethylhexyl acrylate, 1,3-butylene dimethacrylate and acrylic acid in ratios of 65:25:5:0.5:4.5, respectively. It is neutralized to a pH of 7 by the addition of 10% aqueous ammonium hydroxide.

The latices of this invention have a wide variety of uses. A property of diacetone acrylamide polymers which contributes to diveristy of their uses is "breathability"; that is, their high porosity to water vapor and gas. This property is accompanied, however, by resistance to chemical and physical attack so that coatings of diacetone acrylamide copolymers are permanent and furnish a high degree of protection to the coated substrate.

Many of the uses of diacetone acrylamide polymer latices involve the preparation of films or sheets therefrom. (The terms "film" and "sheet," as used in the polymer art, respectively denote fabrications having a thickness of up to 10 mils and greater than 10 mils; for the sake of brevity, the use of the word "film" hereinafter will include both films and sheets.) The preparation of films is accomplished by simply applying the latex to a surface (e.g., by brushing, roller-coating or dip-coating) and allowing it to dry. The latices of this invention dry rapidly at room temperature, but drying may be accelerated by heating at temperatures up to about 125° C. During the drying process, the polymer particles coalesce to form a coherent film.

If close regulation of the thickness of the polymer film is desired, a "doctor blade" may be passed over the surface at the required height after the latex has been spread thereon.

The latices of this invention may be combined with pigments, fillers, dyes, extenders, emulsifiers and solvents of various kinds to form inks, paints and the like. For example, a water-base pigment may be added to the latex in an amount in the range of about 1–40 parts per 100 parts of polymer. When treated in this way, the product of Example 4 is converted into a water-base fingernail polish. Inks may also be prepared by this method, using relatively small amoutns of pigment (about 1–5 parts per 100 parts of polymer). These inks adhere well to metal and plastic surfaces. Raised or embossed inks may be formulated from the acrylic acid-containing latices of Examples 11 and 14.

By the addition of inorganic pigments, extenders, emulsifiers and the like to a latex of this invention, a non-settling water-base paint is obtained which gives a glossy or semi-gloss finish. (The addition of other ingredients such as defoamers, wetting agents, thickeners, mildew suppressers and adhesion improvers is frequently advantageous.) Paints thus prepared have excellent adhesion and rapid drying properties, and are stable to water immersion. Typical of these paint compositions are the following.

| Paint A (semi-gloss): | Parts by weight |
|---|---|
| Titanium dioxide | 400 |
| Water | 80 |
| Lauric alkylolamine condensate | 40 |
| Dibutyl phthalate | 40 |
| Product of Example 4 | 950 |
| Paint B (semi-gloss): | |
| Titanium dioxide | 400 |
| Water | 120 |
| Lauric alkylolamine condensate | 20 |
| Dibutyl phthalate | 20 |
| Methylcellulose (2% aqueous) | 40 |
| Product of Example 4 | 1000 |
| Paint C (gloss): | |
| Titanium dioxide | 250 |
| Water | 81 |
| Ethylene glycol | 30 |
| Sodium polycarboxylate wetting agent (25% aqueous soln.) | 10 |
| Product of Example 4 | 625 |
| Phenylmercuric acetate | 1 |
| Anti-foam agent | 3 |

Water-base paints and inks prepared from acrylic acid-containing terpolymer latices are sometimes too viscous for convenient use. Their viscosity may be decreased to the extent desired by adding a small amount of polyether alcohol or the like, such as polyethylene glycol.

The latices of this invention may also be used to increase the gloss of commercial semi-gloss paints such as alkyd paints. For example, plywood panels coated with a paint composition comprising (1) 4.0 parts of a commercial white alkyd paint and 2.7 parts of the latex of Example 5, or (2) 4.5 parts of the alkyd paint and 3.2 parts of the latex of Example 14, have increased gloss as compared with a control panel coated with the alkyd paint alone.

Many of the latices, especially those of diacetone acrylamide-2-ethylhexyl acrylate-acrylic acid terpolymers, serve as thickeners for water systems, including water-base paints. The trixotropic properties of these latices, as compared with those of two commercial acrylic thickeners ("Carbopol 960" and "Acrysol ASE–60") are shown by the following Brookfield viscosity tests, run at 74° F. (The neutral latices of Examples 9 and 12, and the control polymers, are diluted with water to the indicated solids concentrations.)

| Polymer | Solids content, percent (neutralized) | Viscosity, Brookfield, cps. | | | |
|---|---|---|---|---|---|
| | | 2 r.p.m. | 4 r.p.m. | 10 r.p.m. | 20 r.p.m. |
| Product of Example 9. | 10 | 787,000 | 528,000 | 334,000 | |
| | 5 | 472,000 | 268,000 | 120,000 | 72,000 |
| | 2.5 | 112,000 | 64,000 | 32,000 | 18,400 |
| Product of Example 12. | 10 | 215,000 | 143,000 | 91,700 | |
| | 5 | 188,000 | 102,000 | 48,000 | 27,200 |
| "Carbopol 960" | 1 | 247,900 | 138,500 | 66,500 | 38,100 |
| "Acrysol ASE–60" | 28 | 600,000 | 300,000 | 136,000 | 18,000 |
| | 10 | 160,000 | 92,000 | 46,000 | 29,600 |
| | 5 | 80,000 | 46,000 | 23,600 | 13,800 |

The films obtained by drying solutions of the producss of Examples 9 and 12 are clear and flexible, while those obtained from the "Carbopol" and "Acrysol" polymers are brittle.

Many of the films obtained by casting the latices of this invention on a glass surface have superior tensile strength and elongation properties; some are elastomeric. The following table gives results of various physical tests run on such films.

| Latex | Thickness, mils | Tensile strength, p.s.i.* | Percent elongation | Percent regain |
|---|---|---|---|---|
| Product of Ex. 4 | 9 | 2,605 | 50 | 60 |
| Product of Ex. 8 | 14 | 2,114 | 375 | 87.5 |
| Product of Ex. 11 | 10 | 2,154 | 320 | 0–10 |
| Product of Ex. 14 | 19 | 2,723 | | |

*Average of four readings.

The effectiveness of the latices of this invention for protecting plywood against checking and similar deterioration under severe temperature and humidity conditions is demonsarated by the results of a modification of the "Cleveland Humidity Test." In this test, samples of plywood which have been coated with a 1–2 mil coating of the diacetone acrylamide polymer latex being tested, and dried at room temperature for 24 hours, are subjected on one side only to a 100% relative humidity atmosphere for 22 hours, frozen at −10 F. for one hour and heated at 170° F. for one hour. This cycle is repeated 25 times and the amount of cracking and checking of the plywood panel is noted.

When subjected to this test, an untreated panel was severely cracked after one cycle. A panel treated with the latex composition of Example 5 was nearly intact after 25 cycles, as was a panel coated with the latex composition of Example 14.

Paper may be made resistant to oil by coating with the latices of this invention. In general, a coating thickness of 3 mils or less is adequate; the thickness is preferably regulated by means of a "doctor blade" as described hereinabove. Typical latices which may be used are the products of Examples 4, 8, 11 and 14.

The latex films of this invention are useful as breathable coatings for fabrics for gloves and the like. For example, a mixture of 78 parts by weight of the latex of Example 7, 18 parts by weight of a 2.5% aqueous solution of a sodium salt of polyacrylic acid, and 4 parts by weight of polyethylene glycol is prepared and a flannel fabric is coated with a thin film of this material with the aid of a "doctor blade." The coated fabric is air-dried for five hours at 170–200° F.; after this time it is found to have good water resistance and good to excellent flexibility.

Many of the neutralized acid-containing latices of this invention (e.g., those of Examples 14, 15 and 24) have thermoreversible viscosity properties. The viscosity transition points for these three products are 46° C., 76° C. and about 50° C., respectively. The thermoreversible latices are useful as lacquers for application to paper, plastic or metal surfaces, especially for the protection of printing thereon. For this purpose, the latex may be applied by spraying, roller-coating, dip-coating or curtain coating; it is notable that the latices of this invention are virtually the only latices for which the curtain coating technique is suitable. The latex is applied at a temperature above the thermoreversible point and is then preferably air-dried; during the air drying operation the latex hardens into a transparent film which may be cured and polished.

Latices of N - 3-oxohydrocarbon - substituted acrylamide polymers may be formulated into thermoplastic or pressure-sensitive adhesives. The nature of the adhesive will vary according to the nature of the latex. If it contains little or no plasticizer or plasticizing comonomer, a thermoplastic adhesive is formed. In the following tests, hard maple and plywood surfaces are coated with a film of the latex and are then pressed together and allowed to dry at room temperature for 24 hours. In the case of the plywood surfaces, the samples are then baked for 10 minutes at 65° C. A shearing force is then applied to the samples in a direction parallel to the grain of the wood, and the tensile strength is evaluated from the force needed to rupture the wood or the adhesive bond. The N - 3-oxohydrocarbon-substituted acrylamide polymer latices are compared with a commercial vinyl acetate copolymer glue and with a commercial vinyl acetate-dibutyl maleate emulsion adhesive. Results are given in the following table.

| Adhesive | Wood | Tensile strength, p.s.i.* | Remarks |
|---|---|---|---|
| Vinyl acetate copolymerglue. | Plywood | 410 | 3 samples ruptured at glue line. |
|  | Maple | 336 |  |
| Vinyl acetate-dibutyl maleate. | ....do.... | 278 |  |
| Product of Example 4 | ....do.... | 293 |  |
| Product of Example 5 | Plywood | 618 | All samples broke the wood. |
| Product of Example 6 | ....do.... | 644 | Do. |

*Average of four readings.

These adhesives may also be used with plastics; for example, a vinyl sheet may be coated with the latex which is then dried, after which a second vinyl sheet is applied to form a sandwich-like structure. When the assemblage is heated to about 100–110° C., the film formed from the latex softens and adheres the vinyl sheets.

For use as pressure-sensitive adhesives, the latices should contain a plasticizer such as toluene ethylsulfonamide, diethyl or dibutyl phthalate, an alkylated phenol or the like, or should be prepared using a plasticizing intermonomer such as butyl or 2-ethylhexyl acrylate, dibutyl maleate, butyl vinyl ether or vinylidene chloride. "Internally plasticized" pressure-sensitive adhesives are exemplified by the products of Examples 22 and 23; the latter may be improved, however, by the presence of some additional plasticizer such as dibutyl phthalate. An "externally plasticizer" adhesive may be prepared by mixing the following at room temperature, and subsequently neutralizing with ammonium hydroxide.

|  | G. |
|---|---|
| Product of Example 4 | 250 |
| Product of Example 9 (acidic) | 10 |
| Alkylaryl polyether alcohol sulfonate | 3 |
| Water | 100 |
| 50% xylene solution of a coumarone-indene resin | 40 |
| Dibutyl phthalate | 100 |

Powders suitable for molding and coating formation may be obtained by precipitation or spray-drying of the latices of this invention. For this purpose, it is preferred that the soap or emulsifier content of the latex be kept very low.

Other uses for latices of N - 3-oxohydrocarbon-substituted acrylamides include protective coatings for photographs, preserved plants, etc.; soil binders for airplane landing strips; sizing compositions for fiberglass mat formation; preparation of sheeting for water-repellent garments and coverings such as upholstery and raincoats; produce wrap for foods requiring a semi-permeable package; treatment of leather in shoes, gloves and the like; and formation of magnetic recording tapes by suspension of iron oxide in the latex and formation of a film thereof on a polyester or cellulose acetate backing.

Diacetone acrylamide homopolymer latices in a water-polyethylene glycol mixture (e.g., the product of Example 16) have remarkably good wet-out and coalescing properties, and form films with excellent adhesion, high flexibility, and stability to ultraviolet radiation. Their properties are similar to those of polyvinyl alcohol latices. They may be used for treatment of cotton cloth to give "permanent press" properties; as temporary protective coatings for painted metal surfaces, such as automobile exteriors; as binders for fiberglass mats; and as masking films for use to protect areas during painting.

FILMS

The preparation of films from diacetone acrylamide polymer latices is discussed hereinabove. Films may also be prepared from bulk, solution, suspension or emulsion polymers. The preparation of such films is usually most conveniently effected by dissolving the polymer in a suitable solvent and casting a film on a flat surface, by extrusion, or by similar methods.

The polymeric compositions most suitable for film preparation are the diacetone acrylamide homopolymers and copolymers with acrylic or oxygen-containing monomers.

When the polymer is prepared in solution, this solution may often be used directly for the formation of films. Alternatively, a bulk, suspension or emulsion polymer may be dissolved in a casting solvent and a film formed therefrom. For the preparation of emulsion polymers, one or more of the emulsifiers suitable for latex preparation is generally used, but in lesser quantity than is necessary for latex formation. After the polymerization is complete, the emulsion may be broken by addition of a suitable demulsifier such as a strong acid and the polymer recovered therefrom.

Any of the common free radical catalysts, including those listed above, are suitable for diacetone acrylamide polymerization. They will generally be chosen according to their solubility in the polymerization medium, whether that medium be aqueous or organic.

The casting solvent may be any organic liquid which dissolves the polymer and which may itself be easily removed when the film has been formed. Suitable solvents include aliphatic alcohols, ketones, ethers, esters and the like; aromatic hydrocarbons such as benzene, toluene and xylene; and halogenated aromatic compounds such as chlorobenzene or o-chlorotoluene.

The polymer film is prepared by casting the polymer solution on a suitable surface such as glass or cellophane, the thickness of the solution film being on the order of 1–5 mils, and allowing the solvent to evaporate. In some cases, evaporation of the solvent may be aided by gentle heating. The film is then released from the casting surface by a suitable method, typically by immersing the surface and film in water. Often, the water also serves as a swelling agent for the polymer film.

Films and sheets of diacetone acrylamide homopolymer and copolymers may also be prepared by extrusion, injection molding or similar methods; these are usually more suitable than casting for producing commercial amounts of such films.

It is frequently advantageous to incorporate an auxiliary swelling agent in the casting solution. A film prepared from such a solution containing an auxiliary swelling agent often possesses improved properties as a desalination membrane. A particularly useful swelling agent for this purpose is magnesium perchlorate. When a film is prepared from a poly-(diacetone acrylamide) homopolymer solution containing magnesium perchlorate in an amount equivalent to about 3–10 percent of the weight of the polymer, a swollen film is produced which is strong, has a spongy, leathery consistency and is elastic. This film absorbs up to more than 600 percent of its weight of water, and in doing so swells to about three times its original size.

The properties of the films may often also be improved by heating them prior to swelling them in water. Heating should usually be at about 80–150° C., and may be at atmospheric pressure or at elevated pressures.

The following examples illustrate methods for the preparation of polymer films of this invention by solution, suspension and non-latex emulsion methods.

Example 26

A solution of 375 grams of diacetone acrylamide in 3375 grams of water is blown with nitrogen for one-half hour, and 5 grams of ammonium persulfate and 2.5 grams of sodium sulfite are added. Precipitation of the diacetone acrylamide polymer occurs immediately. Concentrated hydrochloric acid, 2 ml., is added and the mixture is filtered with suction. The polymer is washed with distilled water, air dried for two days and dried under vacuum at 50° C. for one day. The product has an intrinsic viscosity of 1.75.

A film prepared from the diacetone acrylamide polymer by casting a 15% solution thereof in methyl ethyl ketone on a glass surface. After the solvent has evaporated, the glass is immersed in distilled water to release and swell the film.

Example 27

The procedure of Example 26 is repeated, except that the polymer is prepared from monomeric N-(4-oxo-2-butyl)-acrylamide.

Example 28

The procedure of Example 26 is repeated, except that the polymer is prepared from monomeric N-(2,4-diphenyl-4-oxo-2-butyl)acrylamide.

Example 29

A solution of 400 grams of diacetone acrylamide in 3600 grams of benzene is purged with nitrogen, after which 2 grams of benzoyl peroxide is added and the mixture is heated at 60° C., with stirring, for 24 hours. The solution is then cooled, filtered and added dropwise to an 8:1 excess of textile spirits, with stirring. The poly-(diacetone acrylamide) which precipitates is air-dried for 24 hours and then dried in vacuum at 50° C. for 24 hours.

To a solution of 60 grams of the above polymer in 300 grams of methyl ethyl ketone is added, with stirring, 3.75 grams of magnesium perchlorate. A 2-mil film of the polymer is cast from this solution on glass, allowed to dry and heated at 90–100° C. for two hours. It is then immersed in water and allowed to swell for four hours.

Example 30

An emulsion copolymer of diacetone acrylamide and ethyl acrylate (73:27 weight ratio) is prepared by the following method. Diacetone acrylamide, 375 grams, and 5 grams of sodium lauryl sulfate are dissolved in 2,000 grams of water. Ethyl acrylate, 125 grams, is added and nitrogen is bubbled through the mixture for one-half hour, after which 2.5 grams of ammonium persulfate is added. The polymerization mixture is heated to 65–75° C. for six hours and cooled overnight. The resulting copolymer emulsion is filtered with suction and the copolymer is precipitated by adding 5 ml. of concentrated hydrochloric acid. The precipitated copolymer is filtered, washed with distilled water, air-dried for 24 hours and dried in vacuum at 60° C. for an additional 24 hours.

A solution of 20 grams of the above copolymer in 380 grams of methyl ethyl ketone is prepared and a 3-mil film of the same is cast on glass and allowed to dry. After drying, the film is released and swelled by soaking in distilled water for two hours.

Example 31

A 1:1 (by weight) copolymer of diacetone acrylamide and ethyl acrylate is prepared from 37.5 grams of diacetone acrylamide, 37.5 grams of ethyl acrylate, 675 grams of benzene and 0.75 gram of benzoyl peroxide at 60–70° C. After polymerization is complete, 5 ml. of methanol is added and the solution is cooled and filtered. A 50-gram portion is added to a 10:1 excess of textile spirits, and the precipitated polymer is dried in vacuum at 40° C. for 24 hours.

A benzene solution containing about 22 percent of the above copolymer is prepared and a 5-mil film thereof is cast on glass, allowed to dry and soaked in water overnight.

Example 32

A 1:3 (by weight) copolymer of diacetone acrylamide and ethyl vinyl ether is prepared from 25 grams of diacetone acrylamide, 75 grams of ethyl vinyl ether and 1 gram of benzoyl peroxide in 400 grams of benzene, as 60–75° C. After polymerization is complete, the major part of the benzene is evaporated and the reamining solution is added to textile spirits to precipitate the copolymer. Two types of precipitates are obtained: a fluffy material and a tacky substance which, after reprecipitation, is recovered in the form of beads.

A 40 percent solution of the copolymer beads is prepared in methyl ethyl ketone and a 6-mil film thereof is cast on glass, allowed to dry overnight and immersed in distilled water.

Example 33

A 1 percent solution of the diacetone acrylamide-ethyl acrylate copolymer of Example 30 in chlorobenzene is prepared and a 1-mil film thereof is cast, allowed to dry and swollen in water.

Example 34

A solution of 135.2 grams of diacetone acrylamide and 20 grams of methyl methacrylate in 665.6 grams of benzene is heated to 60° C. in a nitrogen atmosphere. Benzoyl peroxide, 0.776 gram, is added and the mixture is maintained at 60° C. for one hour, after which polymerization is stopped by adding one gram of t-butylcatechol. The benzene solution is washed with 250 ml. of water and added to 2000 ml. of textile spirits, whereupon the copolymeric product (78% diacetone acrylamide and 22% methyl methacrylate, by weight) precipitates. It is collected and purified by dissolving in acetone and reprecipitating form water. After the polymer has been vacuum-dried at 48–50° C., it is dissolved in methyl ethyl ketone and a 1-mil film is cast on glass and allowed to dry; a 1.5-mil film is then superimposed thereon and the whole is dried and released by soaking in water. Finally, the film is heated at 140° C. for one hour and soaked in water.

Example 35

The procedure of Example 26 is repeated, except that half the diacetone acrylamide is replaced by an equal weight of acrylonitrile.

Example 36

The procedure of Example 26 is repeated, except that half the diacetone acrylamide is replaced by an equal weight of vinyl acetate.

Example 37

To a solution of 1875 grams of diacetone acrylamide in 5625 grams of isopropanol, maintained in a nitrogen atmosphere, is added 18.75 grams of benzoyl peroxide. The mixture is heated at 65–70° C. for three hours and then cooled to room temperature. There is obtained a solution of a low molecular weight homopolymer of diacetone acrylamide. A flexible, transparent film is formed when the solution is cast on a surface and the solvent allowed to evaporate.

CROSSLINKED FILMS

It is further within the scope of this invention to crosslink polymers of N-3-oxohydrocarbon-substituted acrylamides, thereby forming compositions with high melting points, increased adhesion to surfaces, and resistance to chemical attack.

Two types of crosslinking agents may be used to form the crosslinked polymers of this invention. The first type reacts with the polymer to induce mutually reactive sites on the polymer molecule, thereby causing the formation of a direct valence bond between at least two of said molecules. The mutually reactive sites may be on the polymer chain itself or on the substituent groups. If they are on the chain, they are most conveniently formed by a free radical catalyst and consist of free radicals which may react with each other as described. If the sites are on the substituent groups, they may be formed by any reagent which will create on the subsituent a moiety of reaching with a similar moiety or with another one which is present in the molecule. For example, the terminal methyl group may be oxidized to a carboxy radical which may condense with another such radical to form an anhydride. In general, the term "mutually reactive site" denotes a potential point where at least two polymer molecules can be connected by a valence bond which does not involve atoms extraneous to the polymer being crosslinked.

The second type of crosslinking agent reacts with a plurality of polymer molecules to form a molecular bridge between them. By "molecular bridge" is meant a linkage containing at least one atom extraneous to the polymer itself. The molecular bridge may be organic or inorganic and may be attached to the polymer chain or the substituent, more often the latter.

It will be apparent that the variety of reagents which can be used for crosslinking, especially of the second type described above, is very wide; it includes, in a broad sense, any compound having at least two functional groups which react with the active sites on the polymer molecule (e.g., the carbonyl radical or the active hydrogen atoms). The preferred classes of compounds of this type are polyamines, oxidizing agents and alkoxides of polyvalent metals. Also useful for crosslinking copolymers containing acidic groups (e.g., acrylic acid-containing terpolymers) are polyvalent metal salts or oxides. Suitable polyamines include the alkylene polyamines, heterocyclic compounds such as piperazine, and the like. Especially preferred are alkylene diamines such as hexamethylene diamine. These compounds probably react with the carbonyl group to form a Schiff's base or similar compound, with an alkylene group then connecting two polymeric chains.

Oxidizing agents are believed to function by oxidizing the terminal methyl group to a carboxylic acid group which may then form a salt with the oxidizing agent or its reduction product. The oxidizing agent may also serve as a crosslinker of the first type by forming an acid which in turn condenses with another acid group to form an anhydride. Chomium trioxide is the preferred oxidizing agent, but other suitable oxidizers include potassium permanganate and potassium perchlorate.

The use of polyvalent metal alkoxides probably involves the reduction of the carbonyl group to a hydroxy group followed by either the formation of a polyvalent metal salt through the hydroxy group or elimination of water with the formation of an ether linkage. The preferred alkoxide for this purpose is aluminum isopropoxide.

The use of polyvalent metal salts or oxides for crosslinking is often advantageous when the film is prepared from a latex of a diacetone acrylamide-alkyl acrylate-acrylic acid terpolymer or the like. The reaction of the metal oxide or salt with the polymer may be one of neutralization of the acidic groups, or one of double decomposition of a salt thereof. It preferably occurs in the latex itself, prior to film formation. Crosslinked latices of this type are particularly useful as ingredients in floor waxes and other kinds of protective waxes.

Other crosslinking agents of the second type are polyaldehydes, polymercaptans, polyhydroxy compounds, alkylene polyhalides, epoxides, polyfunctional Grignard reagents and the like. Further, molecules containing mixed functions (such as hydroxy aldehydes) may be used. The modes of reaction of these compounds with the polymer will be apparent to those skilled in the art.

Of the crosslinking agents of the first type, the preferred species are the free radical catalysts. These include benzoyl peroxide, lauroyl peroxide, azobisisobutyronitrile and the like. They are believed to function by creating free radical sites on the polymer chain, thereby causing condensation to form a crosslinked structure.

The preparation of crosslinked films according to this invention is illustrated by the following examples. In Examples 38–48, the polymer is prepared in benzene solution, using a benzoyl peroxide catalyst.

Example 38

A solution of 2 grams of a diacetone acrylamide homopolymer and 0.08 gram of benzoyl peroxide in 18 grams of chlorobenzene is cast on a glass slide and heated for one hour at 100° C. in an oven. The slide is then submerged in water for four minutes and the resulting crosslinked polymer film is removed. The film is insoluble in dimethylformamide.

Example 39

To a solution of 0.5 gram of diacetone acrylamide homopolymer in 9.5 grams of chlorobenzene is added 0.005 gram of azobisisobutyronitrile. A film of this solution is cast on a glass slide and dried in an oven at 100° C. for four hours. The slide is then submerged in water and the film is removed. It melts at 130–135° C.

Similar films are prepared by heating glass slides containing identical solutions for 23 hours and 50 hours, respectively. There is no noticeable difference in properties of the films thus prepared.

A similar film prepared from a diacetone acrylamide homopolymer and 10% azobisisobutyronitrile (calculated on the basis of the polymer weight) melts at 162° C.

Example 40

A 1:3 copolymer of diacetone acrylamide and vinyl acetate is dissolved in chlorobenzene and treated with 10% of its weight of azobisisobutyronitrile. The solution is cast on a glass slide and heated at 100° C. for three hours, after which the film is removed by soaking in water. There is obtained a crosslinked copolymer which melts at 103–107° C.

Example 41

Following the procedure of Example 40, a crosslinked 1:3 copolymer of diacetone acrylamide and vinyl chloride is prepared. This polymer melts above 190° C.

Example 42

Following the procedure of Example 40, a crosslinked 1:3 copolymer of diacetone acrylamide and ethyl acrylate is prepared. The film of this copolymer is more flexible than that of diacetone acrylamide homopolymer, and melts at 96–99° C.

Example 43

A solution of 1 gram of diacetone acrylamide homopolymer and 0.1 gram of hexamethylene diamine in 15 grams of chlorobenzene is cast on a glass slide and dried for three hours under nitrogen, after which it is heated at 110° C. for 70 hours. Upon soaking in water for four hours, a clear film is obtained which melts above 250° C.

Example 44

A solution of 2 grams of a diacetone acrylamide homopolymer and 0.02 gram of chromic acid in 50 grams of dimethylformamide is heated at 90–100° C. for two hours. The dark brown solution is allowed to cool and a film is cast on a glass slide. The slide containing the film is air-dried overnight and heated at 100° C. for one and one-half hours. It is then allowed to cool and removed by soaking in water. There is obtained a film which adheres strongly to glass.

Example 45

A film is prepared according to the method of Example 44, using 2 grams of diacetone acrylamide homopolymer and 0.002 gram of chromic acid.

Example 46

A film is prepared according to the method of Example 44 from a 1:3 copolymer of diacetone acrylamide and ethyl acrylate, using 10% (by weight of the copolymer)

of chromic acid. A flexible film, which can be stretched over 100%, is obtained; this film melts above 220° C.

Example 47

A solution of diacetone acrylamide homopolymer in chlorobenzene is prepared, and a film thereof is cast on a glass slide, dried under nitrogen, and heated at 100° C. for three hours. The film is submerged in a solution of aluminum isopropoxide in acetone for three seconds, removed and heated again at 100° C. for two hours. After cooling, the film is released by submerging in water. The crosslinked film thus obtained melts at 197° C.

Example 48

A casting solution containing poly(diacetone acrylamide) and magnesium perchlorate is prepared as in Example 29, and a 2-mil film of the same is cast on glass and allowed to dry overnight. The film is then immersed in a saturated solution of aluminum isopropoxide in isopropyl alcohol for five seconds, after which it is immersed in distilled water and allowed to swell for four hours before removal.

Example 49

To the latex of Example 11 is added a stoichiometric amount of a complex of zinc acetate with ammonium hydroxide. A double decomposition reaction occurs with the substitution of zinc for ammonium ion in the latex, causing an anionic cross linked product to form A 7-mil film of this product, cast on glass, has a tensile strength of 2076 p.s.i.

DESALINATION OF WATER

General mention has been made of the high water vapor and gas transmission rates of the films of this invention. While these rates vary with the nature of the film (e.g., whether it is a homopolymer or copolymer film, method of polymer and film preparation) their order of magnitude is illustrated by a typical diacetone acrylamide homopolymer film which has a water vapor transmission rate of 805 g./m.$^2$ /24 hr./mil and a gas (oxygen and carbon dioxide) transmission rate of 47,000 cc./m.$^2$/24 hr./mil. Accordingly, these films are useful whenever a "breatheable" or semi-permeable film is desirable. Typical applications include formation of membranes for use in equipment designed to supplement bodily functions, such as artificial kidneys; in purification of chemical products, both aqueous and non-aqueous; and in removal of dissolved impurities, especially salt, from water by hyperfiltration. (As is more completely set forth hereinafter, there is a direct relationship between water vapor transmission rate and utility in desalination.)

The problem of removal of dissolved impurities from water, especially conversion of saline water into potable water, is currently a subject of great interest. Consumption of fresh water in metropolitan areas is often so high that existing water supplies are insufficient to meet the demand. Water shortages of varying degrees of severity have resulted in several parts of the country. In view of the dwindling sources of fresh water and the vast supply of sea water and brackish water which has so far been unusable, the potential importance of methods for desalinating such water is obvious.

Some of the methods which have been proposed for desalination are distillation, crystallization, solvent extraction, ion exchange, electrodialysis, and hyperfiltration or reverse osmosis. The last of these is of great interest because it is potentially the most efficient and economical way of accomplishing desalination. Basically, the process is one in which water containing dissolved impurities is forced under pressure through a membrane which generally passes water more readily than it passes the impurities. It differs from electrodialysis, the other important membrane method, in that water is removed from salt rather than salt from water and that the driving force is pressure rather than electrical potential.

In the present specification, the term "hyperfiltration" is used to refer to any process in which low molecular weight solutes, which are generally inorganic but may include certain organic molecules and also bacteria or viruses in certain instances, are removed from water under pressure by passage through a membrane. The term "reverse osmosis" is often applied to this process because of the commonly held belief that to effect flow of water through the membrane at least enough pressure must be exerted to overcome the osmotic pressure of the solution. This view is not actually correct since all that is really necessary is to overcome the difference between the osmotic pressures of the feed and product solutions. This difference depends on the water flux through the membrane and changes from zero at negligible flow to a limit given by the characteristics of the membrane.

The following terms are frequently used in discussions of the hyperfiltration process.

"Flux" is the quantity of a substance passing through a surface of unit area during unit time. In particular, "water flux" is the amount of water which passes through a surface, such as a membrane, of unit area during unit time.

"Salt rejection" is the amount of the salt rejected by a desalination membrane, and is defined as the difference between the salt concentration of the influent and that of the effluent divided by the salt concentratoin of the influent.

"Water vapor transmission rate" is the amount of water passing through a membrane of unit area and unit thickness within a given time. It has been found that there is a direct correlation between water vapor transmission rate and the solubility of water in the membrane, and hence between transmission rate and the ability of the membrane to function in the hyperfiltration process.

Three properties are essential for a good desalination membrane. First, the polymer comprising the membrane must be hydrophilic. Second, the membrane must have sites for hydrogen bonding. Third, the membrane must exhibit a high permeability of water relative to salt. A fourth property previously considered necessary was a crosslinked or highly crystalline structure in the membrane; however, it has been discovered that the membranes of this invention need not be chemically crosslinked, although such crosslinking may often be suitable and is sometimes desirable.

The polymeric substance which has heretofore been most widely used for the preparation of membranes for desalination by hyperfiltration is cellulose acetate. Films of cellulose acetate are highly hydrophilic and capable of forming hydrogen bonds, but they suffer from a number of disadvantages. First, they must be made by casting from solution, which is not a commercially feasible process for large-scale production. Second, they are low in strength and durability, especially when in contact with solutions high in salt. Third, they require special processing to be usable as desalination membranes. Fourth, they must be kept continuously in contact with water after processing.

As previously mentioned, homopolymer and copolymer films of diacetone acrylamide have high water vapor transmission rates. They have also been found to have high water fluxes; for many of the copolymers, the water flux is 20–30 times that of cellulose acetate. While salt rejection is generally lower for diacetone acrylamide polymers than for cellulose acetate, the vast increase in water flux permits convenient and economical desalination by a number of units connected in series; this method is more completely described hereinafter.

Several interesting structural correlations with desalination effectiveness of the films of this invention have been discovered. In the first place, copolymers of diacetone acrylamide with oxygen-containing monomers are particularly effective; these oxygen-containing monomers include ethers such as ethyl vinyl ether and methyl 2- butenyl ether, ketones such as methyl vinyl ketone and methyl allyl ketone, and esters such as ethyl acrylate, ethyl methacrylate, vinyl acetate and diethyl maleate. Copolymers containing about 10–75% (based on total monomer weight) of a lower alkyl acrylate or methacrylate, especially ethyl acrylate or methyl methacrylate, are preferred.

In the second place, polymers which exhibit a high degree of short-range ordering when examined by X-ray diffraction form particularly good desalination membranes. In general, copolymers with nitrogen- and oxygen-containing monomers show higher short-range ordering than homopolymers; these copolymers include the ones with nitriles such as acrylonitrile and the oxygen-containing ones previously described.

Figure 2:
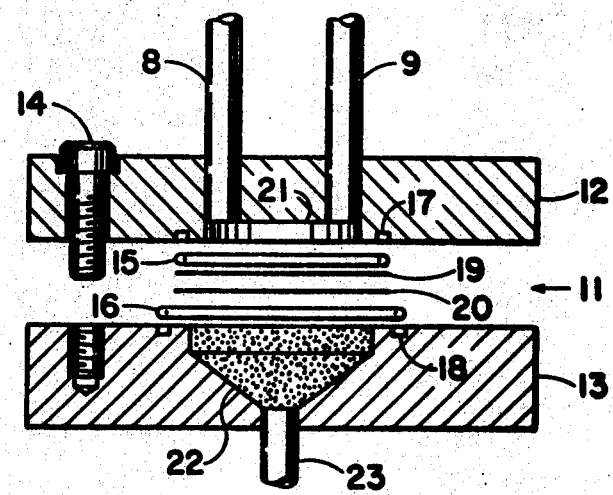

The essential features of a hyperfiltration desalination unit include a pressure cell or vessel for containing the feed (water to be desalinated), circulation means for contacting this water with the membrane, and means for removing the product (desalinated water) on the opposite side of the membrane. A typical unit is shown in the drawings, in which FIGURE 1 is a cross-sectional view of the entire desalination apparatus and FIGURE 2 is a detail of the membrane housing and assembly.

The apparatus consists of an autoclave or similar pressure vessel 1, fitted with a gas inlet 2, a port 3, a gas vent valve 4, and a drain valve 5. The gas inlet 2 is attached to a cylinder or other gas source and carries a pressure gauge 6 and a blowout or safety valve 7.

The autoclave 1 is connected by conduits 8 and 9, the latter being fitted with a pump 10 or equivalent circulation means, to membrane housing 11. This housing consists of two solid housing units 12 and 13, fastened together when in use by a plurality of bolts 14 (of which only one is shown); two sealing members 15 and 16, typically rubber O-rings, which fit into circular grooves 17 and 18 in the housing units, groove 17 forming a circle of smaller diameter than groove 18 so that the membrane fits snugly against its support; the desalination membrane 19; and cushioning means 20, typically a piece of filter paper. Upper housing unit 12 has a shallow cylindrical recess 21 with which conduits 8 and 9 communicate. Lower housing unit 14 has a conical depression in which a porous conical disk 22 is mounted; this depression terminates in outlet port 23.

The operation of the apparatus may be generally described as follows: Autoclave 1 is charged with feed water through port 3, and gas (preferably an inert gas such as nitrogen, helium or argon) is introduced via inlet 2 until the pressure within autoclave 1 has reached the desired level. The feed is circulated through conduit 8, recess 21 and conduit 9 by means of pump 10; alternatively other means of circulation may be used, such as convection which may be effected by cooling conduit 8 and heating conduit 9. Under the pressure in autoclave 1, water is desalinated as it is forced through membrane 19; the product passes through cushioning means 20 and porous disk 22 and is collected at outlet port 23.

The velocity at which the water circulates through recess 21 should be adjusted according to the water flux through membrane 19. In the case of a low-flux membrane, such as cellulose acetate, a low circulation rate such as is provided by convection is sufficient. However, when the water flux is high, a boundary layer of solution of very high salt content is formed at the membrane and this may result in low salt rejection unless the flow of water past the membrane remains turbulent so that the boundary layer is diluted.

The effectiveness of the desalination method of this invention is shown by the following test in which an aqueous solution of 0.5% sodium chloride content (corresponding to brackish water) is desalinated in an apparatus similar to that shown in the drawing. The membranes used in the respective tests are each 2 inches in diameter and are prepared from the polymeric films of this invention. The tests are run at room temperature and at a pressure of 600 or 1000 p.s.i. Circulation of the solution is effected by convection. Samples of the product are taken periodically and tested for salt content, and salt rejection is calculated therefrom. The table gives the maximum salt rejection for each of the membranes tested and also the average salt rejection over the entire test. Water flux values are also given.

| Membrane | Water flux, cc./hr. | Total water volume, cc. | Salt rejection, percent | |
|---|---|---|---|---|
| | | | Maximum | Average |
| Product of Ex. 29 | 85 | 85 | 21.2 | 17.5 |
| Product of Ex. 30 | 1200 | 80 | 59.2 | 49.4 |
| Product of Ex. 31 | 450 | 170 | 27.0 | 13.0 |
| Product of Ex. 48 | 320 | 160 | 23.0 | 17.6 |

In a similar test, the membrane of Example 34 was evaluated at 1000 p.s.i., using a 3.5% salt solution. A circulating pump was used in this test. Salt rejection was 77.4% at a flux of 221 cc./hour.

While the total salt rejection from membranes prepared from the films of this invention is lower than the salt rejection of cellulose acetate, water flux increases markedly and it therefore becomes feasible to connect several desalination units in series and still accomplish the desired desalination process in less time than is required with a single cellulose acetate membrane. For example, the maximum acceptable salt content for potable water is 500 p.p.m., and a salt content of less than 200 p.p.m. is preferred. Starting with sea water containing 5% sodium chloride, a single pass through a cellulose acetate membrane would accomplish this degree of desalination. However, such a pass would require 30 times as long as a pass of an equal volume of water through a single membrane of the diacetone acrylamide-ethyl acrylate copolymer of Example 30. On the other hand, if five desalination units were connected in series, each with the membrane of Example 30, and the water to be desalinated were passed through each of them in series, water with less than 200 p.p.m. of sodium chloride could be obtained in about ⅙ the time required for desalination by means of a cellulose acetate membrane.

In addition to the films, latices and coatings described hereinabove, the polymers of N-3-oxohydrocarbon-substituted acrylamides may be formed by known techniques into a wide variety of other articles, including structural units, fibers and the like.

A portion of the unclaimed subject matter disclosed herein, relating to the above-described method for desalination of water, is disclosed and claimed in copending application Ser. No. 654,415, filed July 19, 1967.

What is claimed is:

1. A film which comprises a homopolymer or interpolymer of an N-3-oxohydrocarbon-substituted acrylamide of the general formula

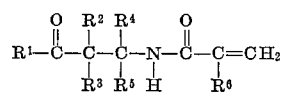

wherein each of $R^1$, $R^2$, $R^3$, $R^4$ and $R^5$ is individually hydrogen or a hydrocarbon radical and $R^6$ is hydrogen or a lower alkyl radical.

2. A film according to claim 1 wherein each of $R^1$, $R^2$, $R^3$, $R^4$, and $R^5$ is individually hydrogen or a lower alkyl radical, said film being permeable to water vapor and gas.

3. A film according to claim 2 which comprises an interpolymer of an N-3-oxohydrocarbon-substituted acrylamide with at least one polymerizable unsaturated monomer.

4. A film according to claim 3 wherein the polymerizable unsaturated monomer is an acrylic or oxygen-containing monomer.

5. A film according to claim 4 wherein the polymerizable unsaturated monomer is an ester of acrylic acid or a mixture of said ester with acrylic acid.

6. A film according to claim 1 which comprises an interpolymer of N-(1,1-dimethyl-3-oxobutyl)acrylamide with an alkyl acrylate or methacrylate, or with a mixture of an alkyl acrylate or methacrylate and acrylic or methacrylic acid.

7. A film according to claim 6 which is prepared from a solution, suspension or emulsion polymer.

8. A film according to claim 7 which comprises a copolymer of N-(1,1-dimethyl-3-oxobutyl)acrylamide with ethyl acrylate or methyl methacrylate.

9. A film according to claim 1 which has been crosslinked by reaction with a compound which induces mutually reactive sites on the polymer molecule, thereby causing the formation of a direct valence bond between at least two of said molecules, or which forms a molecular bridge connecting a plurality of polymer molecules.

10. A film according to claim 9 wherein the N-3-oxohydrocarbon-substituted acrylamide is N-(1,1-dimethyl-3-oxobutyl)acrylamide.

11. A film according to claim 10 wherein the crosslinking agent is a free radical catalyst, a polyamine, an oxidizing agent or an alkoxide of a polyvalent metal.

12. A film according to claim 11 wherein the crosslinking agent is a free radical catalyst.

13. A film according to claim 11 wherein the crosslinking agent is an alkylene polyamine.

14. A film according to claim 11 wherein the crosslinking agent is chromic acid.

15. A film according to claim 11 wherein the crosslinking agent is an aluminum alkoxide.

16. A film according to claim 11 which comprises a crosslinked homopolymer of N-(1,1-dimethyl-3-oxobutyl)acrylamide.

17. A film according to claim 11 which comprises a copolymer of N-(1,1-dimethyl - 3 --oxobutyl)acrylamide with an acrylic or oxygen-containing monomer.

18. A latex comprising a suspension in water, a water-soluble hydroxylated organic solvent or a mixture of said solvent with water, of a homopolymer or interpolymer of an N-3-oxohydrocarbon-substituted acrylamide of the general formula

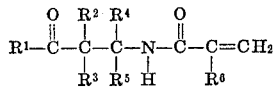

wherein each of $R^1$, $R^2$, $R^3$, $R^4$ and $R^5$ is individually hydrogen or a hydrocarbon radical and $R^6$ is hydrogen or a lower alkyl radical.

19. A latex according to claim 18 wherein each of $R^1$, $R^2$, $R^3$, $R^4$ and $R^5$ is individually hydrogen or a lower alkyl radical.

20. A latex according to claim 18 wherein the N-3-oxohydrocarbon-substituted acrylamide is N-(1,1 - dimethyl-3-oxobutyl)acrylamide.

21. A latex according to claim 20 which comprises a suspension in water of a copolymer of N-(1,1-dimethyl-3-oxobutyl)acrylamide with an acrylic monomer.

22. A latex according to claim 21 wherein the acrylic monomer is a lower alkyl acrylate.

23. A latex according to claim 20 which comprises a suspension in water of a terpolymer of N-(1,1-dimethyl-3-oxobutyl)acrylamide with a lower alkyl acrylate and acrylic acid.

24. A terpolymer latex formed by neutralizing the latex of claim 23 with an alkali.

25. A terpolymer latex formed by neutralizing the latex of claim 23 with a polyvalent metal oxide or salt.

26. A terpolymer latex formed by reacting the latex of claim 24 with a polyvalent metal oxide or salt.

27. A film prepared from the latex of claim 19.

28. A film prepared from the latex of claim 20.

29. A coating prepared from the latex of claim 20.

References Cited

UNITED STATES PATENTS 3,277,056  10/1966  Coleman _____ 260—63

MURRAY TILLMAN, Primary Examiner

W. J. BRIGGS, Assistant Examiner

U.S. Cl. X.R.

117—148, 161; 210—500; 260—29.7, 63, 65, 67, 72, 72.5, 73, 78.5, 80.3, 80.7, 80.72, 80.73, 85.5, 86.1